United States Patent
Morrell et al.

[11] 4,037,936
[45] July 26, 1977

[54] CORRECTING LENS HAVING TWO EFFECTIVE SURFACES

[75] Inventors: Albert Maxwell Morrell, Lancaster, Pa.; Dennis Henry Irlbeck, Cranford, N.J.

[73] Assignee: RCA Corporation, New York, N.Y.

[21] Appl. No.: 458,356

[22] Filed: Apr. 5, 1974

Related U.S. Application Data

[63] Continuation of Ser. No. 298,637, Oct. 18, 1972, abandoned.

[51] Int. Cl.² .......................... G02B 3/02; G03B 41/00
[52] U.S. Cl. ..................................... 350/189; 350/211; 350/213; 354/1
[58] Field of Search ............... 350/175 R, 189, 211 X, 350/213 X; 354/1

[56] References Cited

U.S. PATENT DOCUMENTS

| | | | |
|---|---|---|---|
| 2,082,100 | 6/1937 | Dorey et al. | 350/211 X |
| 2,999,126 | 9/1961 | Harries et al. | 350/189 X |
| 3,177,397 | 4/1965 | Keeran | 350/211 X |
| 3,385,184 | 5/1968 | Ramberg et al. | 350/189 UX |
| 3,495,511 | 2/1970 | Javorik | 350/189 UX |
| 3,628,850 | 12/1971 | Yamazaki et al. | 350/175 R |
| 3,738,234 | 6/1973 | Barten et al. | 350/211 UX |

FOREIGN PATENT DOCUMENTS

| | | | |
|---|---|---|---|
| 1,663,875 | 1953 | Germany | 350/211 |

Primary Examiner—John K. Corbin
Assistant Examiner—Conrad Clark
Attorney, Agent, or Firm—Glenn H. Bruestle; Dennis H. Irlbeck

[57] ABSTRACT

A correcting lens for use in the formation of a color picture tube screen has a first effective surface comprised of a plurality of elements separated by boundaries of discontinuity. Each of the elements in the first effective surface is separately contoured to reduce misregister in the tube. The second effective surface, opposite the first, is contoured to additionally reduce misregister in the tube.

3 Claims, 17 Drawing Figures

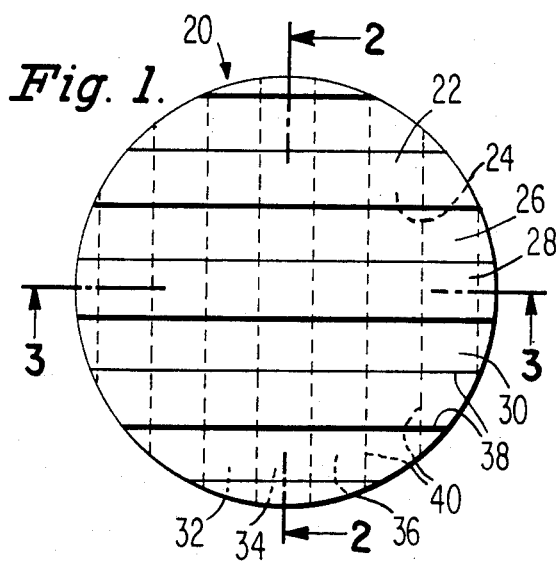
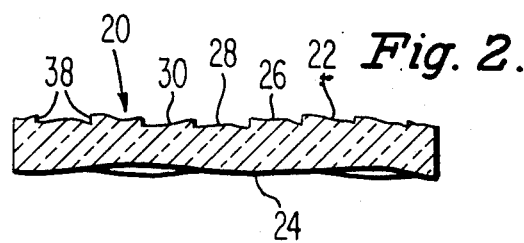
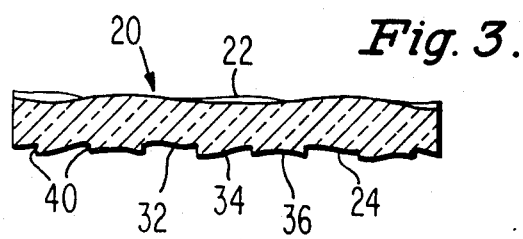
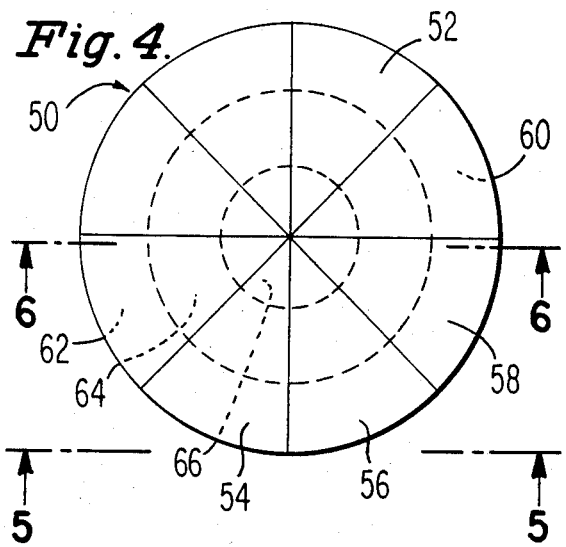
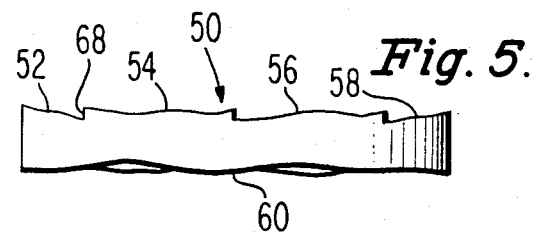
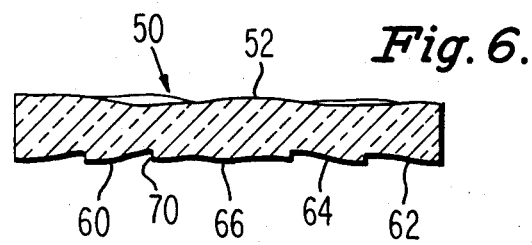

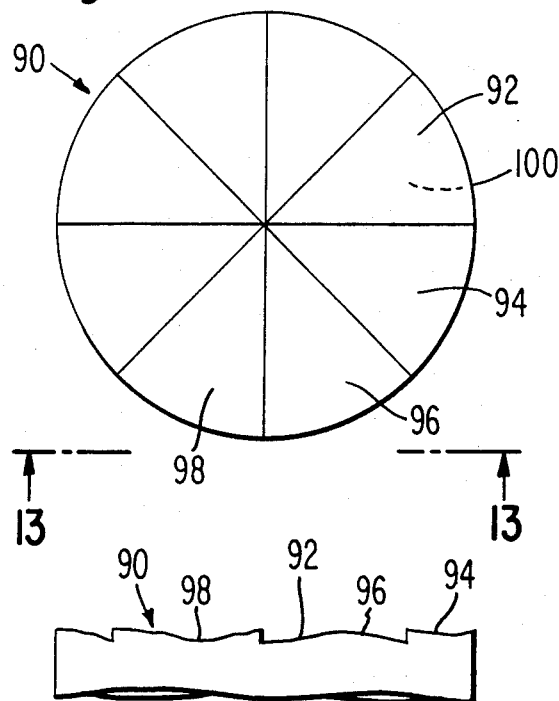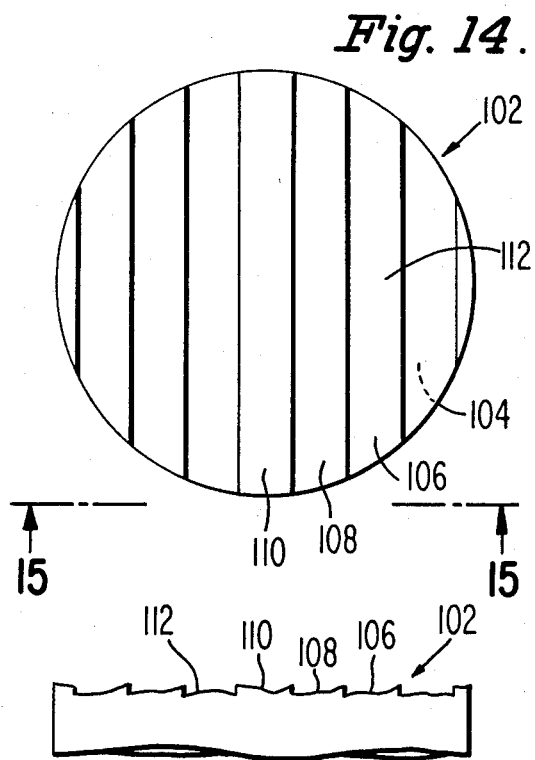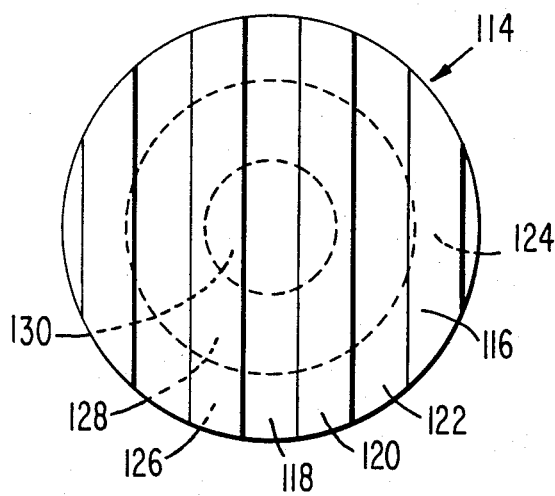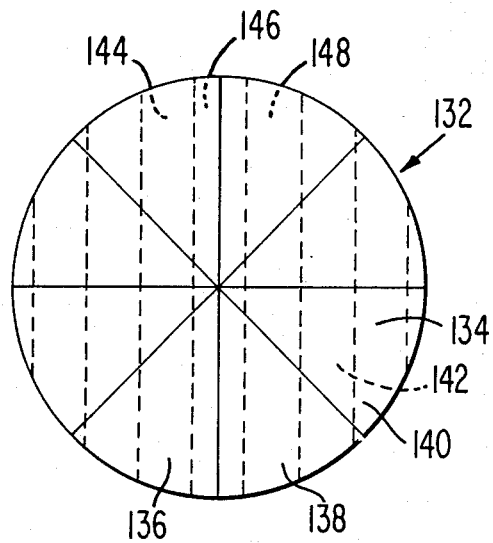

CORRECTING LENS HAVING TWO EFFECTIVE SURFACES

This is a continuation, of application Ser. No. 298,637, filed 10/18/72 and now abandoned.

Background of the Invention

This invention relates to optical correcting lenses for use in photographically laying down arrays of color phosphor deposits in cathode-ray tubes.

Many cathode-ray tubes have mosaic screens or targets of different light-emitting or absorbing material. For example, certain types of color television picture tubes usually include a screen comprising arrays of red, green, and blue-emitting phosphor lines or dots, electron gun means for exciting the screen, and a color selection electrode e.g., an apertured sheet metal mask or a wire grill, interposed between the gun means and the screen. In one prior art process for forming each color array of phosphor lines or dots on a viewing faceplate within a tube having an apertured mask, the inner surface of the faceplate is coated with a mixture of phosphor particles adapted to emit light of one of the three colors (e.g., blue), and a photosensitive binder. Light is projected from a source through the apertured mask and onto the coating so that the apertured mask functions as a photographic master. The exposed coating is subsequently developed to produce phosphor elements of the first phosphor, e.g., blue-emitting lines or dots. The process is repeated for the green-emitting phosphor and red-emitting phosphor utilizing the same apertured mask but repositioning the source of light for each exposure. A more complete description of a prior art process for forming a picture tube screen can be found in U.S. Pat. No. 2,625,734 issued to Law on Jan. 20, 1953.

In exposing the screen through the mask apertures, the light source is sequentially placed in a fixed relationship with each center of deflection of each of the electron beams which later will excite the screen. Unfortunately, these deflection centers are not similarly fixed in position but rather vary in position during operation of the tube. One such variation is a shift toward the screen as the angle of deflection increases. This shift of the deflection center parallel to the tube axis causes a radial misregister of the electron impingement spots on the screen with respect to their corresponding phosphor dots established using a fixed light source.

In the case of a dot screen where three beams are subjected to dynamic convergence, an additional type of deflection center shift occurs. This additional shift is transverse to the tube axis and causes degrouping (e.g., an increase in size of the electron spot trios) misregister of the electron spots related to their associated phosphor dots. These and other types of misregister are discussed in greater detail in U.S. Pat. Nos. 2,885,935 - Epstein et al and 3,282,691 — Morrell et al. In order to correct error between the position of electron beam landing and the location of a phosphor dot, the prior art has provided correcting lenses located between the light source and the tube screen which provide appropriate deflection of the light rays so as to locate the position of the phosphor dots at the expected landing positions on the screen of the electron beams. The design of correcting lenses for use in fabricating color television picture tubes has been described by Epstein et al in U.S. Pat. Nos. 2,817,276 and 2,885,935, by Ramberg in U.S. Pat. No. 3,279,340 and more recently by Yamazaki et al in U.S. Pat. No. 3,628,850.

The Ramberg patent discloses a method of making a color-phosphor mosaic screen that utilizes two lenses, for sequential exposure of each color phosphor. Each lens has a single effective surface that is divided into a plurality of annular elements, adjacent elements being separated by boundaries of discontinuity.

The Yamazaki et al patent discloses a correcting lens also for use in making a color-phosphor mosaic screen, that has a single effective surface divided into a plurality of elements. At least one element must have boundaries of discontinuity that extend in at least two directions.

As pointed out, the lenses of each of the preceding two patents utilize only one effective surface to provide the correction needed in screen formation. The Ramberg lens apparatus requires two lenses and two exposures and is for these reasons somewhat complex and costly. On the other hand, the lens of Yamazaki patent, having discontinuities extending in two directions, is difficult to construct in glass, within the present state of the art.

Summary of the Invention

A correcting lens has a first effective surface comprised of a plurality of elements separated by boundaries of discontinuity. Each of the elements in the first effective surface is separately contoured to reduce misregister in the tube. A second effective surface, opposite the first, is contoured to additionally reduce misregister in the tube.

Detailed Description of the Drawings

FIG. 1 is a plan view of a correcting lens embodying the present invention;

FIG. 2 is a cross-sectional view taken at line 2—2 of FIG. 1;

FIG. 3 is a cross-sectional view taken at line 3—3 of FIG. 1;

FIG. 4 is a plan view of another correcting lens embodying the present invention;

FIG. 5 is a side view taken at line 5—5 of FIG. 4;

FIG. 6 is a cross-sectional view taken at line 6—6 of FIG. 4;

FIG. 7 is a representation of a portion of a tube screen giving the area corrections required for the elimination of misregister.

FIG. 8 is a representation of a first effective surface of a lens, giving the area corrections provided by the surface elements.

FIG. 9 is a representation of the portion of the tube screen of FIG. 7 giving the misregister errors remaining if the effective surface of FIG. 8 were the only effective surface used.

FIG. 10 is a representation of a second effective surface giving the area corrections provided by the surface elements.

FIG. 11 is a representation of the portion of the tube screen of FIG. 7 after a lens having both of the effective surfaces of FIGS. 8 and 10 has been used.

FIG. 12 is a plan view of another correcting lens embodying the present invention.

FIG. 13 is a cross-sectional view taken at line 13—13 of FIG. 12.

FIG. 14 is a plan view of yet another correcting lens embodying the present invention.

FIG. 15 is a cross-sectional view taken at line 15—15 of FIG. 14.

FIG. 16 is a plan view of still another correcting lens embodying the present invention.

FIG. 17 is a plan view of an additional correcting lens embodying the present invention.

Description of the Preferred Embodiments

FIGS. 1, 2 and 3 illustrate a correcting lens 20 having two effective surfaces 22 and 24. Both effective surfaces 22 and 24 are formed with a plurality of elongated strip-shaped elements, e.g., elements 26, 28 and 30 on surface 22 and 32, 34 and 36 on surface 24. The elements on each effective surface are elongated in the same directions and are parallel to all other elements on the same effective surface. The elements of surface 22, however, are perpendicular to the elements of surface 24.

The lens 20 is used in an optical lighthouse between a light source and a color picture tube faceplate to provide optical correction of the light path so that the light exposes photosensitized portions on the faceplate at the predicted or predetermined landing locations of the electron beams of the assembled tube. The surface of each element is individually contoured to provide the best overall optical correction for exposure of the corresponding area of the color television picture tube screen. Because of this individual contouring, slopes of adjacent elements are not continuous and therefore each lens element has a different surface shape from that of its adjacent elements. The differences in levels between elements produces a plurality of boundaries of discontinuity, e.g., 38 and 40 between adjacent elements.

Another correcting lens 50, having two effective surfaces 52 and 60, is shown in FIGS. 4, 5 and 6. In the lens 50, one effective surface 52 is divided into a plurality of pie-shaped elements e.g., 54, 56 and 58 and the opposite effective surface 60 is divided into a plurality of annularly shaped elements 62 and 64 surrounding a center disc shaped element 66. As in the preceding lens embodiment, each element on each side of the lens is individually contoured and separated from its adjacent elements by discontinuous boundaries, e.g., boundaries 68 on effective surface 52 and boundaries 70 on effective surface 60.

There are several concepts which may be utilized in contouring each of the elements for each effective surface. For example, the curvature of lens elements on both effective surfaces required for elimination or reduction of misregister could be calculated simultaneously. Or alternately, the curvature of elements on one effective surface could be calculated to reduce misregister; and any compromises used on that surface could be compensated for by suitably contouring the other effective surface. This latter concept of lens design will now be explained with the use of the illustrations of FIGS. 7-11. FIG. 7 shows a small portion 72 on a television picture tube screen which has been divided into small square units e.g., 73. Nominal numbers are given for the landing error of misregister corrections required to prevent misregister in the designated areas. A lens portion 74 having a first effective surface 75 of three strip-shaped lens elements 76, 78 and 80, is shown in FIG. 8. Nominal numbers representing the correction power of portions of the effective surface are listed. To maintain surface continuity within each element of the lens, it is assumed that adjacent areas of each lens element cannot vary by more than one correction unit. If this were the only effective surface used to provide correction in the formation of the screen, the errors remaining after screen formation would be as shown in FIG. 9. Such errors, however, are eliminated or at least additionally reduced by proper contouring of the elements 82, 84 and 86 of the second effective surface 88 of the lens 74 as shown in FIG. 10 to correct for the error left by the first effective surface. The resultant misregister error is as shown in FIG. 11.

Another lens 90, having two effective surfaces 92 and 100, are shown in FIGS. 12 and 13. In this lens 90, a first effective surface 92 is shown divided into a plurality of pie-shaped elements, e.g., 94, 96 and 98, while the other effective surface 100 is contoured in a continuous manner. It is possible to use the first effective surface 92 to correct for misregister errors caused by one factor while utilizing the continuous contour of the second effective surface 100 to correct for the remaining misregister errors. Similarly, lens 102 having a continuously contoured effective surface 104 could also use strip-shaped elements, e.g., 106, 108 and 110, on the other effective surface 112, as shown in FIGS. 14 and 15. Of course, the pie-shaped or strip-shaped elements could also be used to correct for more than one cause of misregister error thereby simiplifying the contour and construction of the continuously contoured effective surface.

Two further correcting lenses 114 and 132 embodying the present invention, are shown in FIGS. 16 and 17, respectively. In FIG. 16, one effective surface 116 is formed with a strip-shaped element, e.g. 118, 120 and 122, while the other effective surface 124 is formed with annular ring elements 126 and 128 surrounding a disc shaped center element 130. The lens 132 of FIG. 17 has one effective surface 134 divided into pie-shaped elements e.g. 136, 138 and 140, and the opposite effective surface 142 is divided into strip-shaped elements, e.g. 144, 146 and 148.

Each of the foregoing lenses can be constructed out of a single homogeneous piece of material or out of a plurality of parts. For example, the lens 20 of FIGS. 1, 2 and 3 can be formed in two disk-shaped parts. An effective surface can be formed on each part and the parts combined to form the complete lens. The parts of the combined lens may either be bonded together or spaced. When the parts are spaced, compensation must be made to accomodate for the extra refractive surfaces. Alternatively, each part could be constructed out of a plurality of strips, each strip corresponding to an element of the lens.

Although a limited number of elements have been illustrated on each lens, it is to be understood that each effective surface could be divided into hundreds of elements in order to provide more exact misregister correction. It is also understood that the slopes and contours required for accurate misregister correction can be obtained utilizing suitable computer controlled apparatus.

The foregoing embodiments can be constructed of any suitable refractive material, e.g., glass or optical plastic. When the lenses are constructed of glass, it is preferable to form the lens of individual sections so that each surface and interface can be properly ground. After grinding and polishing, the sections are attached together to form the composite lens. If the lenses are constructed of optical quality plastic, they may be formed by pressure molding the plastic against a suitable die. preferably, the die consists of multiple segments of material, such as stainless steel, that are properly ground to conform to the lens specifications and are held together in a suitable jig.

We claim:

1. A correcting lens for use in the formation of a color picture tube screen comprising,
    two effective surfaces on opposite sides of said lens, each surface comprising a plurality of elements separated by boundaries of discontinuity, one of said surfaces having radially extending boundaries of discontinuity and elements on opposite sides of said lens contoured to cooperatively reduce misregister in said tube.

2. A correcting lens for use in the formation of a color picture tube screen including,
    a first effective surface comprising a plurality of pie-shaped elements separated by boundaries of discontinuity, each of said elements separately contoured to reduce misregister in said tube, and
    a second effective surface opposite said first effective surface, said second effective surface comprising a plurality of elements separated by boundaries of discontinuity, each of said elements of said second effective surface separately contoured to additionally reduce misregister in said tube.

3. The lens as defined in claim 2, wherein said second effective surface comprises annular ring elements.

* * * * *